May 3, 1966 E. D. ALDERSON ETAL 3,248,877
THRUST DEFLECTOR
Filed Sept. 18, 1963 2 Sheets-Sheet 1

INVENTORS.
EDGAR D. ALDERSON
JOHN T. KUTNEY
BY

ATTORNEY-

May 3, 1966    E. D. ALDERSON ETAL    3,248,877
THRUST DEFLECTOR
Filed Sept. 18, 1963    2 Sheets-Sheet 2
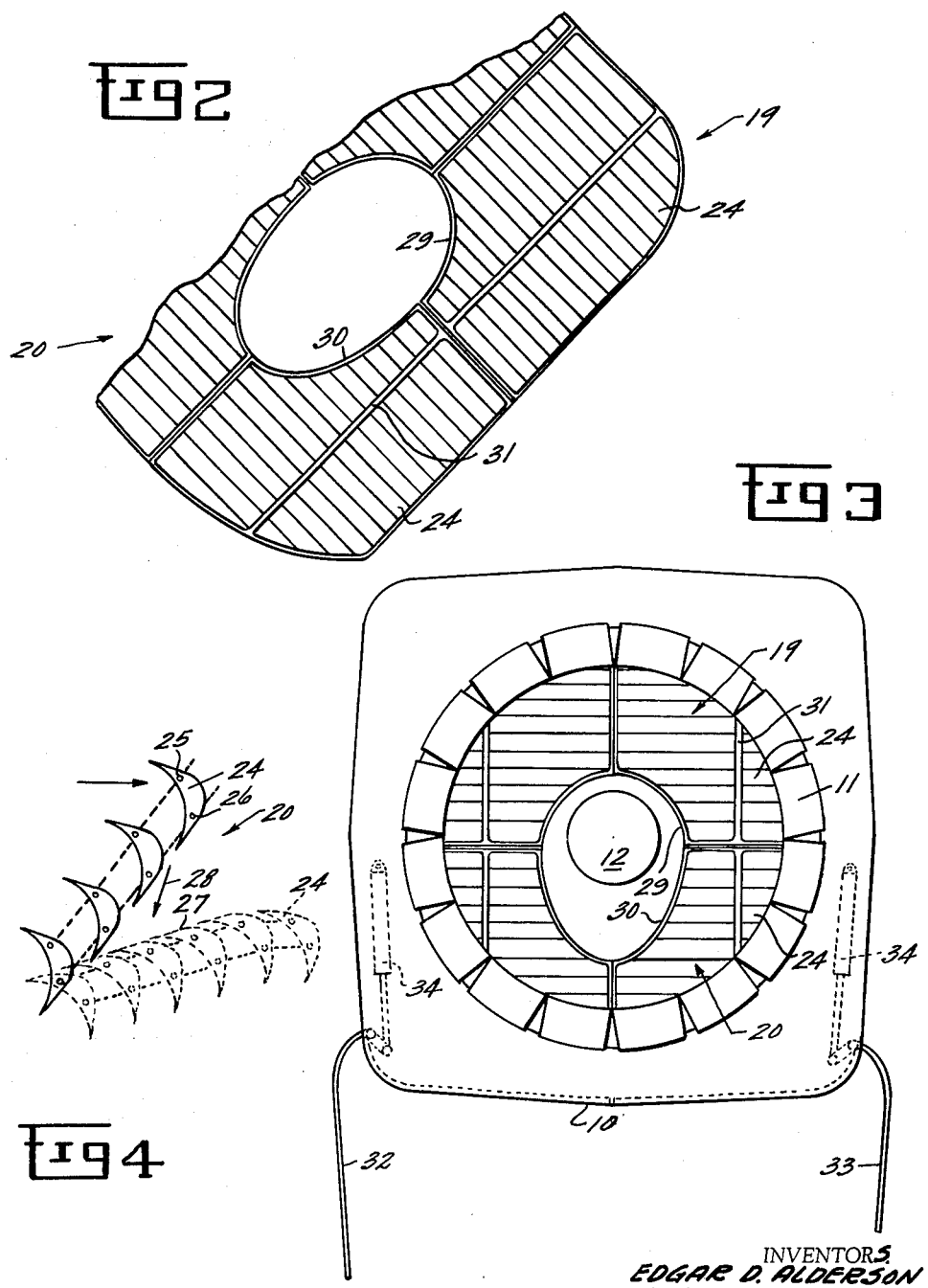
INVENTORS
EDGAR D. ALDERSON
JOHN T. KUTNEY
BY
ATTORNEY United States Patent Office 3,248,877
Patented May 3, 1966

3,248,877
THRUST DEFLECTOR
Edgar D. Alderson and John T. Kutney, Cincinnati, Ohio, assignors to General Electric Company, a corporation of New York
Filed Sept. 18, 1963, Ser. No. 309,617
9 Claims. (Cl. 60—35.54)

The present invention relates to a thrust deflector, and more particularly, to a thrust deflecting means for use in a cruise fan type powerplant. Additionally, means for reversing the thrust is also disclosed.

A typical powerplant considered for aircraft propulsion is that type known as a cruise fan. Generally, this is a powerplant in which a centerbody may carry a large fan at its forward end and the fan, in turn, is surrounded by a tubular casing or nacelle through which air is pumped by the fan to produce thrust. Conveniently, the fan may be of the tip turbine type where turbine buckets are mounted on the end of the fan blades and driven by exhaust gas from a gas generator that may be located elsewhere. Such powerplants are highly efficient and move large quantities of air at relatively low velocities. Additionally, in any aircraft employing such powerplants, it may be desirable to provide lift on the aircraft and this may be done by rotating the whole engine, be it a jet engine or a cruise fan, in a well known manner or by deflecting the exhaust. The difficulty with rotating a cruise fan is that cruise fans of the tip turbine type are generally large both in diameter and length. Because of this size, rotation may be impractical since the powerplant might strike the ground or the exhaust might be so close to the ground that undesirable back pressure affects are produced. Additionally, rotation may require very large actuation forces.

A more practical means of obtaining vertical lift on such a powerplant is to divert or deflect the fan stream downward. The cruise fan is different from an ordinary jet engine in that it is a low pressure ratio device and is quite sensitive to back pressure. That is, if blockage is imposed behind the fan to turn or deflect the flow downward, the back pressure on the fan is increased and it will operate inefficiently and result in a performance loss.

The most effective way to turn the flow is through a cascade of louvers which do not produce much back pressure and can operate on a free stream. A cascade can thus turn the flow without any appreciable pressure drop. Such a cascade merely consists of a series of preferably airfoil louvers that may be fixed in a frame or may be made to rotate or move within the frame. Generally, such cascades are well known.

Cruise fans are generally quite large in diameter, as previously noted, in order to move a large mass of air at low velocities. Consequently, placing a large cascade across the cruise fan exhaust creates the problem of stowage when deflected thrust is not desired. During the cruise mode the cascade must be stowed out of the way in a practical manner in order to eliminate performance loss during cruise. In operation, it must intercept the stream at an angle, for example 45°, which, in conjunction with the camber of the individual louvers, may deflect the flow 90° or more downward with little pressure change across the fan. Additional turning beyond 90° by different camber or movable louvers, as well as a different angle of the whole cascade frame, may provide thrust reversal.

Cruise fans may generally take two forms. They may be of the plug nozzle type which, in conjunction with a shroud around it, forms a nozzle between the plug and shroud and the plug extends beyond the downstream end of the shroud. The annular nozzle between the two may be varied to provide different thrust. In such an application the central plug member may form a convenient member for stowage of the cascades and such a type is shown in co-pending application, Serial No. 309,689 filed September 18, 1963 and assigned to the assignee of the instant invention.

The other type of cruise fan may employ the finger type nozzle for reasons of installation or performance and this differs from the plug nozzle arrangement in providing a casing or nacelle with a variable well known finger nozzle or its equivalent at the downstream end of the casing. In this type powerplant a centerbody may be provided as an aerodynamic member for the flow of fluid through the casing and may also be supported centrally of the casing and carry a cruise fan for accelerating air through the casing or nacelle for thrust. The cruise fan may conveniently be a tip turbine fan of the type that is well known in the art and is driven by exhaust gas acting on turbine buckets and then exhausting into the airstream. It is this latter type of powerplant to which the thrust deflector of the instant invention is directed.

The primary object of the present invention is to provide a thrust deflector of the type described which may be easily stowed within the confines of the structure present in the jet propulsion powerplant.

Another object is to provide a thrust deflector which may turn all the flow or only part of the flow in the intermediate positions to thus vector the thrust.

A further object is to provide a deflector that may be used for reversing the thrust.

Another object is to provide a two part deflector that stows easily and in operating condition for full thrust deflection, forms a continuous cascade across the main flow stream.

A further object is to provide such a thrust deflector that is especially applicable to tip turbine cruise fans of the variable area nozzle type wherein the nozzle is at the aft end of the nacelle.

Briefly stated, the invention is directed to a thrust deflecting means for use in a jet propulsion powerplant of the cruise fan type which has a tubular casing or nacelle and a central body disposed centrally thereof. The tubular casing has a portion of substantially rectangular cross section in it and terminates in a variable nozzle at the downstream end beyond the centerbody. A tip turbine fan is carried by the centerbody to move thrust fluid longitudinally through the casing and out the nozzle for thrust. The casing or nacelle is provided with a recess means at the top and bottom of the rectangular portion and the bottom recess has an opening below it for the passage of deflected fluid. Thrust deflecting means comprising a two part cascade with an upper louvered portion and a lower louvered portion is provided for deflection of the fluid. Pivot means support each of the portions transversely within the recesses and actuating means rotate the portions to an open position across the casing to intersect the thrust fluid and deflect all the fluid in the same direction through the opening to provide a vertical lift component. In fully open position the two part cascade provides a continuous cascade completely across the fluid flow. Reverse and vectored thrust may be obtained by the position of the louvers within the cascade as well as the angle of the cascade, or by the addition of louvers, and/or by making the louvers movable within the cascade. Closing means such as bomb bay doors are provided to close the opening in the casing when the cascade portions are stowed in the casing recesses.

While the specification concludes with claims particularly pointing out and distinctly claiming the subject matter which is regarded as the invention, it is believed the invention will be better understood from the following description taken in connection with the accompanying drawing in which:

FIG. 2 is a plan view of one of the cascades looking into the deflected exhaust opening of FIG. 1;

FIG. 3 is an end view from the right of FIG. 1 and showing the doors open during deflecting operation; and FIG. 4 is a detailed view of a partial cross-section of louvers showing linkage for the movement of the louvers during operation of the pair of cascades.

Figure 1:
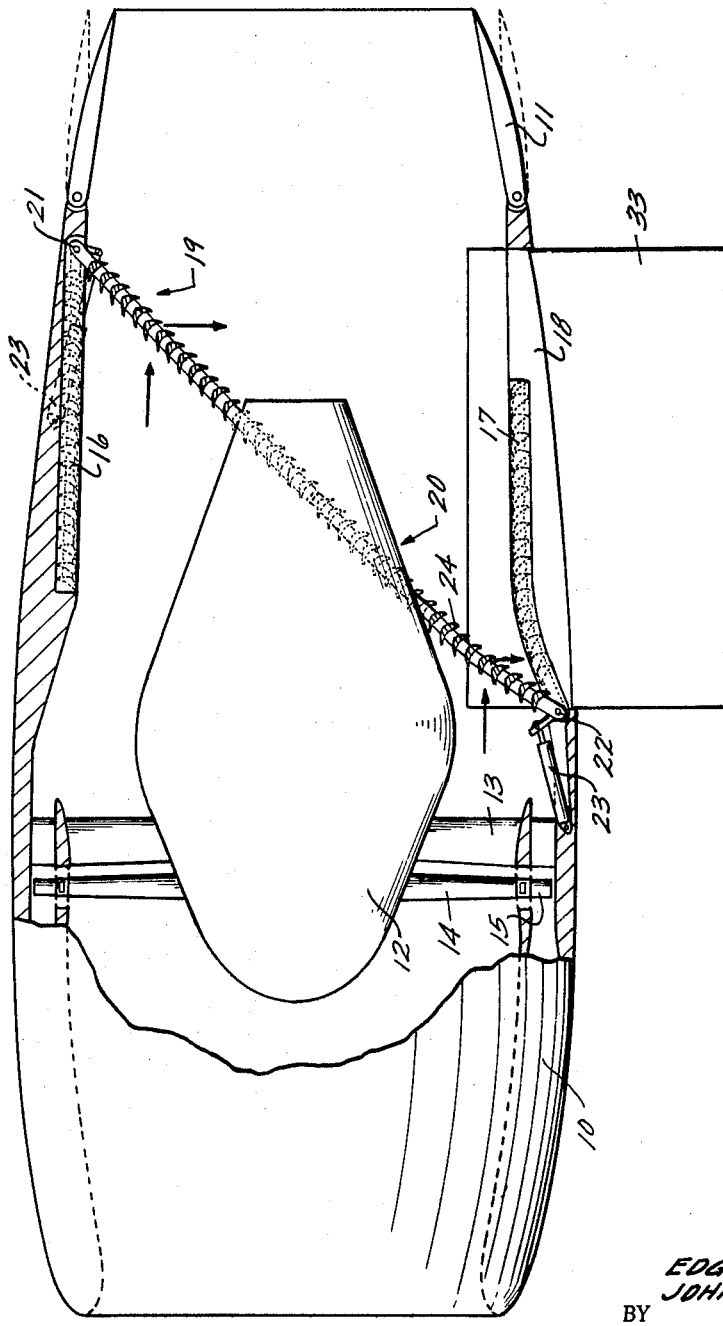
FIG. 1 is a cross-sectional view of a typical powerplant showing the thrust deflecting means in open operating condition and showing the stowed condition in dotted lines.

Referring first to FIG. 1 there is shown a general arrangement of a cruise fan powerplant employing a tip turbine fan within a casing or nacelle and having a variable nozzle at the downstream end. It should be understood that the invention is not confined to such a powerplant but, for ease of illustration and description, is described in connection with such a jet propulsion powerplant. Such a cruise fan may consist of a tubular casing 10, which may be a nacelle, to form an air intake as the powerplant is moved through the air. Additional components include a nozzle 11 of the variable type provided at the downstream end of the casing, and a centerbody 12 disposed centrally within the casing and supported by any suitable means such as struts 13. Centerbody 12 will, of course, have an appropriate aerodynamic shape for the flow of fluid thereby. Acceleration of the air to exhaust through the nozzle is obtained by a fan 14 which may be carried within the casing on the forward end of the centerbody. This fan may conveniently be a tip turbine fan of the type that is well known to the art and is driven by exhaust gases acting on turbine buckets 15. A fan of the general type shown in U.S. Patent 3,033,492 is the type contemplated in the instant invention wherein the outer casing or nacelle is provided with variable nozzle 11 as described.

As previously stated, the cruise fan type of powerplant described is large in diameter, perhaps eight feet or more and may be two to three times that long. Consequently, it is a large structure to rotate and requires large actuation forces in the even that vertical thrust is desired in this manner. The powerplant may be supported from pylons on the wing or mounted from the fuselage as shown in the referenced patent as well as other ways known in the art. Regardless of its location or mounting, it is desired to obtain vertical lift from the powerplant by deflecting the thrust of the fluid flow therethrough. This fluid consists of the ambient air through the casing as well as the exhaust gases exiting from turbine buckets 15. To divert or turn the fluid, it is necessary to interject a deflecting means in the motive fluid stream. However, this means must be stowed out of the main stream during cruise or horizontal operation and with the powerplant shown there is only one logical place to stow such deflecting means and that is in the casing 10. However, stowage within the casing presents mechanical problems of providing a circular member that must still intersect all of the main stream. In order to overcome this difficulty, casing 10 is provided intermediate its length with a portion of substantially rectangular cross-section and this is in the vicinity of the cascades as will be apparent as the description proceeds. It is immaterial whether the forward and aft ends of the casing are rectangular or circular. Preferably, they would be circular in the conventional fashion and would transition into the rectangular cross-section in the generally central longitudinal portion of the powerplant. Thus, the powerplant may go from the forward end aft in a round, rectangular and then round portion with a variable nozzle. The provision of the rectangular cross-section simplifies the stowage problem for the cascades which are stowed within the tubular casing in the cross-sectional portion but the section is not limited to rectangular. To this end, the casing is provided with a recess 16 and 17 in the top and bottom of the rectangular portion respectively. For the exit of all the deflected fluid in one direction, the casing also has an opening 18 therein below the bottom recess 17.

In order to deflect the fluid flow through the powerplant, there is provided a two part thrust deflecting means comprising an upper louvered cascade portion 19 and a lower louvered cascade portion 20 shown in open operating or deflecting position in FIG. 1. These cascades are designed to divert all the fluid flow in the same direction through the casting opening 18 to provide vertical lift on the powerplant.

Because of the powerplant arrangement, and the necessity to divert all the fluid in one direction, as well as the desirability of easy stowage, the cascades are made in two portions as shown. For the cascade portions to provide a complete intersecting blockage for full diversion across the entire fluid flow, the upper portion 19 is preferably pivoted at its downstream end at 21 to support the portion transversely within the casing recess when stowed. Thus, the upper portion rotates from its stowed position in recess 16 to open in the upstream direction. In this position across the fluid flow as shown in FIG. 1 it intersects the fluid. Similarly, the lower cascade portion 20 is pivoted transversely within the rectangular portion preferably at its upstream end at pivot 22 and is rotatable to open in the downstream direction to intersect the fluid. Any suitable actuating means 23 may be used to operate the cascade portions. It will be apparent that the full open position of the cascades as shown provides a single continuous cascade of fluid intersecting louvers which cascade may align itself at about 45° across the main flow. Obviously, this angular alignment may be varied as required.

Reference to FIG. 4 shows how the individual cambered louvers 24 may be mounted on two pivots 25 and 26 and suitably actuated by means not shown to provide a linkage that, as the cascade rotates, moves the louvers from full deflection shown at 45° position to stowage shown in the horizontal position. The louvers are thus turned as the cascade is returned to its recess so that they provide a smooth wall 27 in the casing when the cascades are stowed in their respective recesses. If the actuating means for turning the individual louvers is made independent of the means rotating the cascade, it can be seen that the louvers may be turned beyond the vertical position to provide a reverse thrust component as shown by the arrow 28 in FIG. 4.

Depending on the length and size of the centerbody 12 and the desirability of maintaining the cascades as far forward as possible in order to bring the vertical line of thrust closer to the center of gravity of the vehicle, the individual cascade portions 19 and 20 may be provided with suitably shaped cut-outs 29 and 30 respectively, as shown in FIG. 2, in order to complement or fit with the centerbody and provide complete interception of the main fluid flow in operative position. The generally rectangular shape of one of the cascade portions is shown in FIG. 2 and it can be seen that it may conveniently be stowed flat within the rectangular portion of casing 10 in the respective recesses. Suitable strengthening means such as rib 31 may be provided where required.

During cruise operation and stowage of the cascades it is necessary to provide a smooth wall portion for the flow of air thereby. The previously described rotation of the individual louvers provides smooth inner wall 27. Additionally, the outer wall of the casing must also conform to cruise operation and for this purpose, a pair of doors 32 and 33 that are larger than the cascades, are provided to close the opening 18 during cruise. As seen in FIG. 3, the doors are simply bomb bay type doors that are open as shown solid in FIG. 3, for the passage of all the diverted fluid and are rotated closed as shown dotted by any suitable actuation means 34 for cruise operation.

Additional louver means may be provided within the opening 18 for further turning to a forward direction but it is preferred to obtain the needed reverse thrust by actuation of the louvers 24 within the cascades.

It will be apparent that vectored thrust may also be obtained within the combination described by operation of the upper and lower cascades or individual louvers to intermediate positions not shown. Such operation merely insures that only part of the fluid is intercepted in the less-than-open position across the casing and the resultant vector is composed of both a horizontal rearward directed vector as well as a vertical vetor. Primarily, the cascades are intended to be operated in the fully open position intersecting all the flow as shown in FIG. 1.

With the powerplant shown, it will be apparent that the two part cascade is required in order to successfully intercept all the fluid and direct it all downwardly to obtain a vertical component and the provision of the rectangular cross-section provides both a convenient stowage as well as a simpler cascade mechanism since everything lies in a common plane.

Additionally, it will be seen that the rotation of the individual louvers within the cascade to provide smooth wall 27 in the closed position permits the cascades to be fully extended to their maximum dimension in the diverted position shown in FIG. 1 and, at the same time, may be rotated to a thinner overall dimension when folded within the recess in the casing.

While there has been described preferred forms of the invention, obvious modifications and variations are possible in light of the above teachings. It is therefore to be understood that within the scope of the appended claims, the invention may be practiced otherwise than as specifically described.

We claim:

1. A jet propulsion powerplant having a tubular casing and a centerbody disposed centrally thereof,
    said tubular casing having a portion of substantially rectangular cross section therein and terminating in a nozzle at the downstream end thereof beyond said centerbody,
    means on said centerbody to move thrust fluid longitudinally through said casing and out said nozzle for horizontal thrust,
    thurst deflecting means comprising,
    louvered cascade means pivotally supported within said casing,
    said cascade means including upper and lower portions,
    said upper portion being pivoted at its downstream end to said casing and pivotal to open in the upstream direction across the upper portion of said casing,
    said lower portion being pivoted at its upstream end to said casing and pivotal to open in the downstream direction across the lower portion of said casing,
    and recess means in said casing to stow said cascade portions out of said fluid in closed position,
    actuating means for pivoting said cascade means within said casing at said rectangular cross section to an open position across said casing for intersecting said thrust fluid and deflecting all said intersected fluid in the same direction to provide a vertical lift component on said powerplant.

2. Apparatus as described in claim 1 wherein said louvers of said cascades are pivotal therein to provide a substantially smooth wall in said casing in stowed closed position.

3. Apparatus as described in claim 1 wherein said cascade portions have cut-outs therein to conform to said centerbody, and said portions thereby form a single plane of fluid intersecting louvers across said casing and said centerbody when pivoted to open position.

4. Apparatus as described in claim 3 wherein said casing is provided with door means on the lower part thereof,
    and actuation means connected to said door means for opening thereof during intersection of said fluid and closing during stowage of said cascades.

5. A jet propulsion powerplant of the cruise fan type having a tubular casing and a centerbody disposed centrally thereof,
    said tubular casing having a portion of substantially rectangular cross section therein and terminating in a variable nozzle at the downstream end thereof beyond said centerbody,
    tip turbine fan means carried by said centerbody for movement of thrust fluid longitudinally through said casing and out said nozzle for horizontal thrust,
    recess means in said casing at the top and bottom of said rectangular portion,
    said casing having an opening therein below said bottom recess,
    thrust deflecting means comprising,
    an upper louvered cascade portion and a lower louvered cascade portion,
    means pivotally supporting said portions transversely within said recesses in said casing,
    actuating means for pivoting said portions to an open position across the upper and lower portions, respectively, of said casing for intersecting said thrust fluid and deflecting all said intersected fluid in the same direction through said casing opening to provide a vertical lift component on said powerplant.

6. Apparatus as described in claim 5 wherein said upper cascade portion is pivoted at its downstream end and is pivotal to open in the upstream direction to intersect said fluid,
    and said lower cascade portion is pivoted at its upstream end and is pivotal to open in the downstream direction to intersect said fluid.

7. Apparatus as described in claim 6 wherein said louvers of said cascade portions are rotatable therein to provide a substantially smooth wall in said casing when said portions are stowed in said recesses.

8. Apparatus as described in claim 7 wherein said cascade portions have cut-outs therein to conform to said centerbody and said portions thereby form a single plane of fluid intersecting louvers across said casing and said centerbody when pivoted to open position.

9. Apparatus as described in claim 8 wherein said casing is provided with door means over said casing opening,
    and actuation means connected to said door means for opening thereof during intersection of said fluid and closing during stowage of said cascade portions.

(References on following page)

References Cited by the Examiner

UNITED STATES PATENTS

| | | |
|---|---|---|
| 2,667,185 | 1/1954 | Beavers. |
| 2,681,548 | 6/1954 | Kappus _____ 60—35.54 |
| 2,774,554 | 12/1956 | Ashwood et al. _____ 244—23 |
| 2,841,954 | 7/1958 | Rainbow _____ 60—35.54 |
| 2,929,580 | 3/1960 | Ciolkosz _____ 244—12 |
| 2,931,172 | 4/1960 | Billman _____ 60—35.54 |
| 2,932,164 | 4/1960 | Watson _____ 66—35.54 |
| 2,947,501 | 8/1960 | Flint. |
| 3,016,700 | 1/1962 | Howald _____ 60—35.54 |
| 3,028,121 | 4/1962 | Klapproth _____ 244—23 |
| 3,035,792 | 5/1962 | Klapproth _____ 60—35.54 X |
| 3,040,524 | 6/1962 | Kurti _____ 60—35.54 |
| 3,087,303 | 4/1963 | Heinze et al. _____ 60—35.55 |
| 3,127,741 | 4/1964 | Pottharst _____ 60—35.54 |

FOREIGN PATENTS

| | | |
|---|---|---|
| 913,312 | 12/1962 | Great Britain. |
| 922,645 | 4/1963 | Great Britain. |

MARK NEWMAN, *Primary Examiner.*

A. L. SMITH, *Assistant Examiner.*